W. A. PENFIELD.
ANTIVIBRATION DEVICE FOR VEHICLES.
APPLICATION FILED FEB. 4, 1909.
924,825.
Patented June 15, 1909.
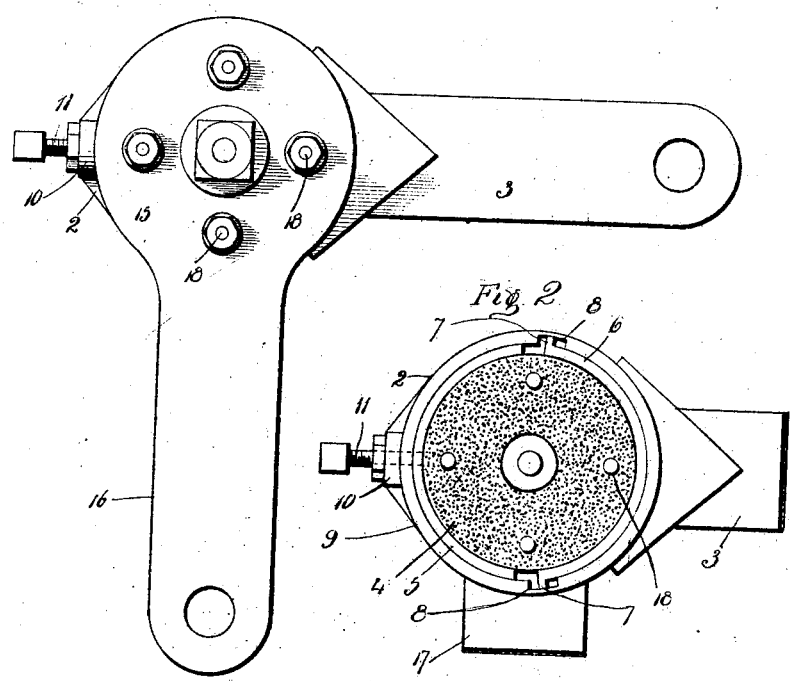

UNITED STATES PATENT OFFICE.

WILLIAM ALLEN PENFIELD, OF MERIDEN, CONNECTICUT.

ANTIVIBRATION DEVICE FOR VEHICLES.

No. 924,825.  Specification of Letters Patent.  Patented June 15, 1909.

Application filed February 4, 1909. Serial No. 476,120.

*To all whom it may concern:*

Be it known that I, WILLIAM A. PENFIELD, a citizen of the United States, residing at Meriden, in the county of New Haven and State of Connecticut, have invented a new and useful Improvement in Antivibration Devices for Vehicles; and I do hereby declare the following, when taken in connection with the accompanying drawings and the figures of reference marked thereon, to be a full, clear, and exact description of the same, and which said drawings constitute part of this specification, and represent, in—

Figure 1 a plan view of an anti-vibration device constructed in accordance with my invention. Fig. 2 a top or plan view of the same with one of the plates and washers removed, the arms being broken away. Fig. 3 a transverse sectional view on an enlarged scale.

This invention relates to an improvement in anti-vibration devices for vehicles, that is, a device particularly adapted for automobiles and connected with the body and with the axle so as to absorb or prevent the shock which takes place when running over an uneven road, and prevents the sudden movement of the body with relation to the axle and so as to not only make the vehicle ride more comfortably but diminishes the strain upon the springs.

The object of the invention is a simple arrangement of parts for this purpose and consists in the construction hereinafter described and particularly recited in the claims.

In carrying out my invention I employ a circular head 2 formed integral with or attached to an arm 3 which is adapted to be connected with the body of the vehicle or with the axle in the usual manner of devices for this purpose. Within this head is a circular block 4 preferably formed from felt, and between this block and the inner wall of the head is an annular friction ring 5. This may be formed in a single piece and extend substantially around the chamber, or it may be formed in two parts as shown in Fig. 2 of the drawings, the part 6 which is substantially semicircular being formed with ears 7 at its ends to enter notches 8 in the inner wall of the chamber. On the opposite side of the block is a corresponding semi-circular ring 9. The head is also formed with a hub 10 threaded to receive a screw 11 which bears against the clamping ring and radially compresses the felt block so as to increase the friction between the block and the ring. On opposite sides of the block are retaining washers 12 and 13, and outside these washers are plates 14, 15, which are formed with arms 16, 17 which are connected with the body or with the axle. The plates 14, 15, are connected together by bolts 18 which also rigidly secure the block to the plates so that the rotation of the plates rotates also the block, thereby producing frictional engagement between the ring and the periphery of the block, and it will be noted that the washers and plates are not in contact with the head, consequently there is no frictional engagement between them. Turning the screw 11 increases or diminishes the friction between the block and the ring. The arms 16, 17, being connected to one part, and the arm 3 to the other part, when the body moves with relation to the axle these arms will be turned and the friction between the block and the ring will prevent sudden movement in either direction.

I claim:—

1. An anti-vibration device for vehicles, comprising a chambered head, a block within said head, plates on opposite sides of said head, said plates connected together and with the said block, and means for radially compressing said block.

2. An anti-vibration device for vehicles comprising a chambered head, a compression ring within said head, a block in said ring, plates on opposite sides of said head, said plates connected together and with said block, and means for radially compressing said block.

3. An anti-vibration device for vehicles comprising a chambered head, an arm formed therewith, a compression ring within said head, a block within said ring, plates on opposite sides of said head, said plates connected together and with said block, and means for radially compressing said ring, substantially as described.

4. An anti-vibration device for vehicles comprising a chambered head formed with an arm, a ring within said head, a felt block within said ring, washers on opposite sides of said block, plates outside of said washers, said plates formed with arms, said plates and washers connected together and with said block, a screw mounted in said head and adapted to contract said ring, substantially as described.

In testimony whereof, I have signed this specification in the presence of two subscribing witnesses.

WILLIAM ALLEN PENFIELD.

Witnesses:
W. E. HAMMOND,
WM. L. PENFIELD.